J. E. COWEL.
SHADE ROLLER.
APPLICATION FILED APR. 30, 1921.

1,406,934.

Patented Feb. 14, 1922.

John E. Cowel
INVENTOR

BY Victor J. Evans
ATTORNEY

UNITED STATES PATENT OFFICE.

JOHN ELLIOTT COWEL, OF CREST, COLORADO.

SHADE ROLLER.

1,406,934.  Specification of Letters Patent.  Patented Feb. 14, 1922.

Application filed April 30, 1921. Serial No. 465,786.

*To all whom it may concern:*

Be it known that I, JOHN ELLIOTT COWEL, a citizen of the United States, residing at Crest, in the county of Weld and State of Colorado, have invented new and useful Improvements in Shade Rollers, of which the following is a specification.

The object of my present invention is the provision of a shade roller equipped with simple, durable and reliable means for rotating the roller to raise a shade and for retaining the shade in the position in which the same is placed.

To the attainment of the foregoing, the invention consists in the improvement as hereinafter described and definitely claimed.

In the accompanying drawings, forming part hereof:—

Similar numerals of reference designate corresponding parts in all of the views of the drawings.

Figure 1:
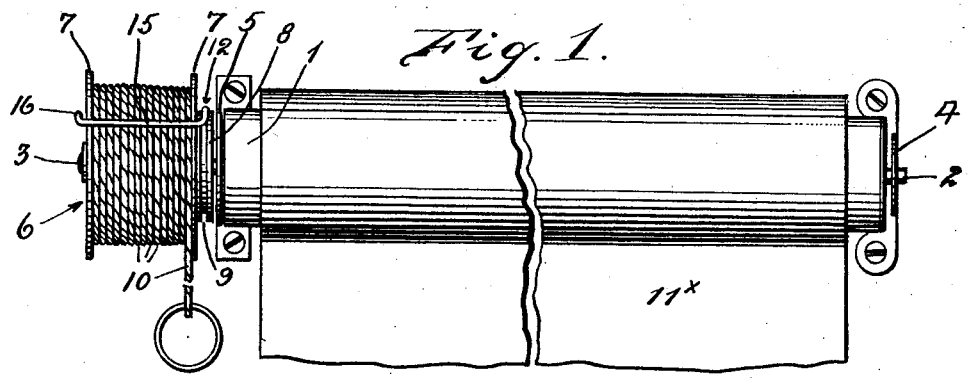
Figure 1 is a broken front elevation of a shade roller equipped with my improvement.
Figure 2:
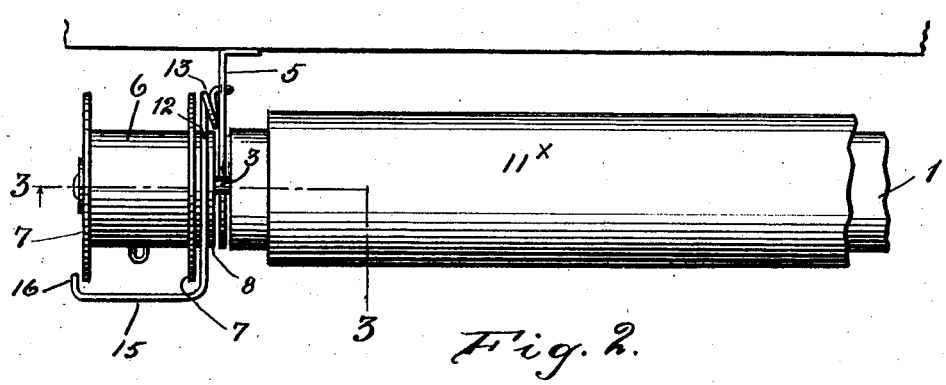
Figure 2 is an enlarged top plan view showing one end portion of the roller and my improvement.

The shade roller 1 is of wood or other appropriate material and is provided at its ends with journals 2 and 3; the said journals 2 and 3 being journaled in brackets 4 and 5 and the journal 3 being extended considerably toward the left beyond the bracket 5.

In accordance with my invention a spool 6 with flanges 7 is fixed on the extended portion of the journal 3. The said spool 6 is provided at its inner end with a portion 8 in which is a circumferential groove 9.

A cord 10 is connected to the periphery of the spool 6 and is designed to be wound or taken up on the spool when the shade $11^x$ on the roller 1 is drawn downwardly.

Figure 4:
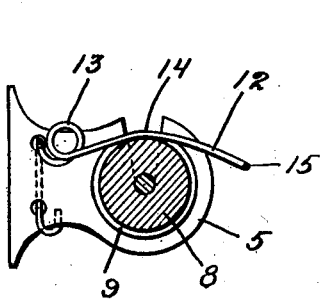
Figure 4 is a section taken on the line 4—4 of Figure 3, looking toward the right.
Figure 3:
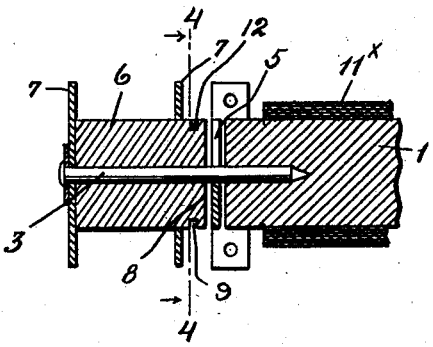
Figure 3 is a longitudinal vertical section taken on the line 3—3 of Figure 2.

Fixed to the bracket 5, Figure 4, is the before mentioned tensioning spring which is indicated by 12. The said spring 12 is coiled at 13 to lend increased resiliency thereto, and is curved as indicated by 14 to seat in the circumferential groove 9 and to frictionally bear against the spool portion 8 with a view to preventing casual rotation of the spool 6 and the roller 1 and gravitation of the shade $11^x$. On the outer portion of the spring 12 is a lateral arm 15 that reaches outwardly at right angles to the spool flanges 7 and is provided with an inwardly directed terminal 16 that rests at the outer side of the outer flange 7. Manifestly the said arm 15 on the spring 12 will serve to confine the cord 10 between the flanges 7 of the spool 6 so as to preclude displacement of the cord and avert interference with the operation of the shade roller and the several parts of the improvement.

In the practical use of my improvement it will be apparent that when stress is applied to the shade $11^x$ and said shade is drawn downwardly, the cord 10 will be taken up on and coiled about the spool 6. The spring 12 in cooperation with the spool portion 8 will retain the shade in the position in which the shade is placed, and when it is desired to raise the shade it is simply necessary for the operator to draw downwardly on the cord 10.

I have entered into a detail description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

The combination of a shade roller having journals, a shade attached to the roller, brackets in which the journals of the roller are arranged, a spool fixed on one of said journals at the outer side of the adjacent bracket and connected by said journal to the roller and having flanges and also having an inner portion in which is a circumferential groove, a cord attached to the spool and arranged to be wound or taken up on the spool when the shade is drawn downwardly, and a tensioning spring connected to the last mentioned bracket and coiled to increase its resiliency and having a curvilinear portion to seat in the groove and bear frictionally against the said inner portion of the spool and also having a lateral arm arranged across and spaced from the spool flanges and terminating in an inwardly directed portion arranged at the outer side of the outer flange.

In testimony whereof I affix my signature.

JOHN ELLIOTT COWEL.